(12) United States Patent
Mazzini

(10) Patent No.: US 11,707,991 B2
(45) Date of Patent: Jul. 25, 2023

(54) MOTOR VEHICLE WITH SIMULATOR OF PERFORMANCE OF A MECHANICAL GEARBOX

(71) Applicant: Solaredge Technologies Ltd., Herzeliya (IL)

(72) Inventor: Samuele Mazzini, Umbertide (IT)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/678,211

(22) Filed: Feb. 23, 2022

(65) Prior Publication Data

US 2022/0176830 A1   Jun. 9, 2022

Related U.S. Application Data

(63) Continuation of application No. 16/327,442, filed as application No. PCT/IT2017/000207 on Sep. 26, 2017, now Pat. No. 11,299,048.

(30) Foreign Application Priority Data

Sep. 27, 2016  (IT) .................. 102016000096737

(51) Int. Cl.
   *B60L 15/20*    (2006.01)
(52) U.S. Cl.
   CPC ........... *B60L 15/20* (2013.01); *B60L 15/2009* (2013.01); *B60L 15/2054* (2013.01); *B60L 2240/423* (2013.01)
(58) Field of Classification Search
   CPC .. B60L 15/20; B60L 15/2009; B60L 15/2054; B60L 2200/22; B60L 2240/12; B60L 2240/421; B60L 2240/423; B60L 2240/48; B60L 2250/24; B60L 2260/30; B60L 7/14; B60L 7/12; Y02T 10/64; Y02T 10/72

See application file for complete search history.

(56) References Cited

U.S. PATENT DOCUMENTS

| | | |
|---|---|---|
| 6,855,016 B1 | 2/2005 | Jansen |
| 2008/0060861 A1 | 3/2008 | Baur et al. |
| 2013/0214921 A1 | 8/2013 | Meschke et al. |
| 2013/0294619 A1 | 11/2013 | Valeri et al. |
| 2014/0195088 A1 | 7/2014 | Schuessler |

(Continued)

FOREIGN PATENT DOCUMENTS

| | | |
|---|---|---|
| CN | 101007510 A | 8/2007 |
| CN | 201559760 U | 8/2010 |

OTHER PUBLICATIONS

International Search Report and Written Opinion dated Apr. 16, 2018 for counterpart PCT Application No. PCT/IT2017/000207.

(Continued)

*Primary Examiner* — Michael J Zanelli
(74) *Attorney, Agent, or Firm* — Banner & Witcoff, Ltd.

(57) ABSTRACT

A vehicle having a motor with a transmission, provided with a fixed gear ratio, to a propelling unit includes a virtual gearbox including a microprocessor, operatively interfaced with the motor and programmed to manage and check the generation of motor driving torque, limiting, at the motor output, a maximum angular velocity and a maximum torque which are variable with a predetermined law.

20 Claims, 1 Drawing Sheet

(56) References Cited

U.S. PATENT DOCUMENTS

2015/0166048 A1\* 6/2015 Herrmann ............ B60W 20/30
                                                  180/65.265
2015/0197195 A1   7/2015 Hera et al.

OTHER PUBLICATIONS

Anonymous: "Direct Drive Motor and Gear Ratio to Use—DIY Electric Car Forums", diyelectriccar forum, Jan. 19, 2012, XP055367895, DIY Electric Car Forum; URL: http://www.diyelectriccar.com/forums/showthread.php/direct-drive-motor-and-gear-ratio-68468.

Benji, Jerew: "Do Electric Cars Have Gears No. Heres Why", Feb. 11, 2015, XP055367902, URL: https//www.greenoptimistic.com/electric-cars-gears/#WQChjHpMfSi.

\* cited by examiner

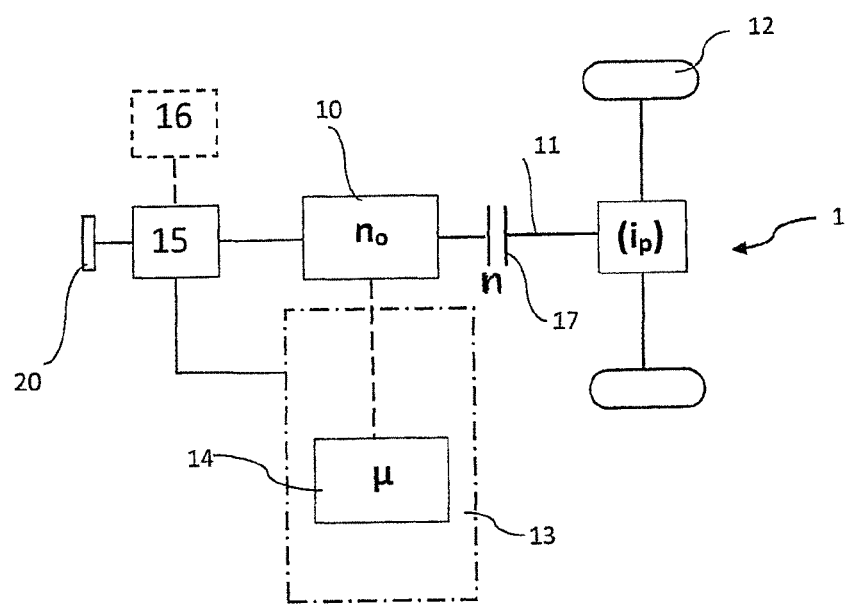

MOTOR VEHICLE WITH SIMULATOR OF PERFORMANCE OF A MECHANICAL GEARBOX

CROSS-REFERENCE TO RELATED APPLICATIONS

This application is a continuation of U.S. application Ser. No. 16/327,442, filed Feb. 22, 2019, which is the National Phase of International Application PCT/IT2017/000207, filed Sep. 26, 2017, which designated the U.S. and that International Application was published under PCT Article 21(2) in English, and claims priority to Italian Application No. 102016000096737, filed Sep. 27, 2016, the contents of which are hereby incorporated by reference in their entireties.

TECHNICAL FIELD

This invention relates to a motor vehicle having a transmission with fixed gear ratio to a propelling unit, equipped with a simulator of the performance of a mechanical gearbox.

BACKGROUND ART

As is known, the performance of a vehicle propulsion motor is defined by means of mechanical characteristics consisting of the torque "C" and the maximum angular velocity "n" of the motor, whilst the performance of a vehicle equipped with the motor is characterised by two mechanical parameters, consisting of the tractive force "F" at the driving wheels, that the vehicle must apply in order to move a working load, and the speed "V" at which the movement occurs.

In vehicles, operation of the mechanical gearbox allows the achievement of high vehicle tractive forces (and, therefore, high levels of acceleration) in low gears, correlated with low speeds, and low tractive forces but high speeds with high gears.

The performance of certain types of vehicle having a transmission with fixed gear ratio (final drive ratio)—as is the case, for example, in certain vehicles for recreational activities, such as go-karts which take their motive power from a direct drive electric motor—generally speaking for some categories of users is not as entertaining and enthralling as that which could otherwise be obtained using an internal combustion engine. The latter, in contrast, comprises a gearbox with variable gear ratios, interposed between the engine and the axle, and which transmits to the wheels the engine power factors (torque and angular velocity n), modified depending on the desired, or necessary, temporary propulsion conditions of the vehicle at the various gears provided by the gearbox.

To satisfy such a type of demand from users, there are already prior art simulators comprising an electronically actuated gearbox, managed by electronic operating and checking means, that the user controls using gear selectors which can be operated from the steering wheel of the vehicle driving position.

Disadvantageously, these simulators have many moving parts which, on one hand have a negative effect on vehicle performance reliability, making frequent maintenance necessary and thereby rendering such simulators not very suitable for rental vehicles; and, on the other hand, make the vehicle heavy, penalising its racing performance; and increase vehicle costs.

Another disadvantage of these systems is the fact that they offer fixed reduction ratios (i1; i2; i3; ... in) that are often not suitable for the circuit or for the driving style of the driver and that require more or less complex and expensive operations in order to change them.

On the other hand, the use of a mechanical gearbox may also be disadvantageous at a commercial level, considering the increase in costs that may apply to the vehicle due to the physical presence of the gearbox and the clutch.

DISCLOSURE OF THE INVENTION

The aim of this invention is to overcome the disadvantages of the prior art, by means of electronic simulation of a mechanical gearbox with variable gear ratios, which can be implemented practically without use of additional parts that have weight and of significantly appreciable movement for the configuration of the vehicle.

In accordance with the invention, that result is achieved by a vehicle defined as in any of the appended claims.

BRIEF DESCRIPTION OF THE DRAWINGS

The advantages of the invention are more apparent in the detailed description which follows, with reference to the accompanying drawings which illustrate an example, non-limiting embodiment of the invention, in which:

FIG. 1 is a schematic functional block diagram of a vehicle according to this invention.

DESCRIPTION OF PREFERRED EMBODIMENTS OF THE INVENTION

With reference to FIG. 1 of the accompanying drawings, the numeral (1) denotes in its entirety a vehicle having a motor (10) with a transmission (11), with fixed gear ratio (ip), to a propelling unit (12) shown as the driving wheels of the vehicle (1).

The vehicle (1) is preferably—by way of example and without limiting the invention—a go-kart equipped with an electric motor (10).

The motor (10) and the transmission (11) can be dynamically connected by a coupling (17) that makes the motor (10) independent of the wheels (12) and that, once the motor (10) has been started with no load, allows gradual application of the external load.

The vehicle (1) comprises a virtual gearbox (13), that is to say, a simulator of the performance of a mechanical gearbox which electronically simulates the latter by means of suitable real-time check of the parameters for generating and supplying driving torque for the motor (10).

More particularly, said virtual gearbox (13) comprises microprocessor means (14), located on a suitable printed circuit board, which are operatively interfaced with the motor (10) and programmed to manage and check the generation of the maximum driving torque (Co) parameters, with constant power, preferably maximum, and with angular velocity (n at the motor (10) output, that is to say, at the transmission (11) input, which are variable, with a suitably predetermined law.

The variable velocity (n) is correlated with a corresponding driving torque of the motor (10) according to variable gear ratios (i1; i2; i3; ... in), preferably with separate values relating to the different gears that a hypothetical discontinuous speed variation mechanical gearbox would have, if the latter were actually and physically present in the vehicle (1).

Selecting means (15) for selecting the velocity (n) at the transmission (11) input are provided associated with a steering wheel (20) of the vehicle (1). Said selecting means can be activated with a manual command, deliberately, issued by the vehicle driver, from the steering wheel (20), and transmitted as input to the microprocessor means (14) for starting—for each characteristic gear of the virtual gearbox (13)—and in real time all of the processing operations that allow a corresponding suitable electric motor (10) management in terms of torque (C) and corresponding angular velocity (n) with vehicle (1) constant power, preferably maximum.

Obviously, the microprocessor means (14) can manage the supply of driving power even according to different functions, which are in any case correlated with the simulation of an automatic gearbox that is real and physically present on the vehicle (1).

In fact, they can allow simulation, via software, even of a variation of the velocity (n) according to multiple gear ratios (i1; i2; i3 . . . in), whose values are programmable as desired by the user, for example, according to a mathematical progression, different on each occasion, for example selected relative to distinctive features of the various tracks on which the go-kart may race.

Moreover, the microprocessor means (14) may manage the operating parameters of the electric motor (10) in such a way as to also generate, if necessary, a counter-driving torque useful for vehicle (1) braking.

That function can be exploited, for example, to advantageously simulate downshifting, that is to say, "engine braking" due, for example, to intrinsic friction of an internal combustion engine. Therefore, all conditions able to give the vehicle driver sensations of inertia, of mass, like those that would be felt when driving a vehicle powered by an internal combustion engine.

Moreover, said counter-driving force may be modulated, even with variable intensity using a different law of variation, depending on the virtual gear, in the progression of gears of the gearbox, or in the idle state in which the vehicle (1) is stationary with the motor (10) running.

The microprocessor means (14) can also allow generation of the driving torque (Co) of the motor (10) simulating the law of progression during acceleration (picking up again, or from a standing start) of a real vehicle operating with inertias and frictions whose numerical values are processed by the microprocessor means (14).

The microprocessor means (14) can manage operating parameters of the electric motor (10) even simulating engagement and disengagement of a mechanical clutch.

Sound reproducing means (16) can also be provided, for reproducing sounds, corresponding to the sound spectrum of a real internal combustion engine (10), sounds that are harmonised, depending on the motor (10) speed, where the expression virtual speed means the speed that an engine system would have with a gearbox having the same gear ratio selected as in the virtual gearbox.

In the above description reference was made to a vehicle able to move with a torque (C) and velocity (n) which are variable according to a gear ratio (i) that is stepped, that is to say, having a series of separate predetermined ratios. However, it is clear that the driving torque supply parameters of the motor (10) may also be implemented in such a way as to simulate a continuously variable transmission if that law of simulation is of interest.

To better explain several distinctive features of the invention, the following non-limiting comparison may be used by way of example. Consider a vehicle with a hypothetical mechanical gearbox having separate ratios and reduction ratios of i1=2, i2=1.5 and i3=1, with a constant torque curve equal to 50 Nm and n=5,000 rpm, maximum values, which respectively allow the achievement of maximum speeds for each gear of 25 km/h, 37.5 km/h and 50 km/h, with respective torques at the wheels of 100 Nm, 75 Nm and 50 Nm. Then take a vehicle with the invention installed and install a motor (10) able to supply a constant torque of 100 Nm from 0 to 5,000 rpm, with a fixed reduction ratio if=1. When virtual gear No. 1 is engaged in the vehicle, the electric motor is set in real time to supply a maximum of 100 Nm of torque from 0 to 2,500 rpm, allowing the vehicle to reach the maximum speed of 25 km/h with a torque at the wheels of 100 Nm, precisely as in vehicle 1 in gear No. 1. Then, when virtual gear No. 2 is engaged, the electric motor (10) is choked so that it supplies a maximum of 75 Nm of torque at the wheels with a maximum speed of 37.5 km/h, just like in gear No. 2 of the vehicle equipped with the mechanical gearbox, and so on.

It is possible to calculate the virtual revolutions per minute (rpm) of the electric motor (10) in order to make them equivalent to the motor (10) that has a mechanical gearbox. In that way, with virtual gear No. 1 engaged, when the vehicle reaches the speed of 25 km/h, the virtual revolutions per minute (rpm) are 5,000. This makes it possible to reproduce a simulated sound that emulates the tone of a motor (10) with a gearbox, and to reproduce on a display the virtual rpm of the motor, in a condition such that, for example, first gear is engaged and the rev counter is at the full-scale position, when the rpm are 2,500 (but the virtual rpm are 5,000).

The invention achieves the proposed aims, also providing the additional advantages of high levels of operating effectiveness and stability, as well as being inexpensive to make, maintain and use.

In conclusion, the invention operates by performing fully electronic adjustment and management of the drive unit driving power generating and supplying curves, operations that are carried out in real time as a virtual simulation of the dynamics of a vehicle equipped with a mechanical gearbox having multiple gears. All of that is done despite the fact that the vehicle in question is actually fitted with a physical transmission having a single, fixed ratio.

The invention described above is susceptible of evident industrial application. It may also be modified and adapted in several ways without thereby departing from the scope of the following claims.

Moreover, all details of the invention may be substituted by technically equivalent elements.

The invention claimed is:
1. A method comprising:
  programming a microprocessor to emulate a virtual gearbox of a vehicle, wherein the programming comprises setting limits of a maximum angular velocity and a maximum torque according to a predetermined rule, wherein the predetermined rule is set according to a speed of the vehicle;
  providing, by an electric motor, an angular velocity and a torque to a transmission with a fixed gear ratio; and
  limiting, using the microprocessor, the angular velocity and the torque of the electric motor according to the maximum angular velocity, the maximum torque, and the speed of the vehicle, wherein the virtual gearbox simulates a plurality of gear ratios of a mechanical gearbox.

2. The method of claim 1, wherein the maximum torque and the maximum angular velocity are variable while keeping a power from the electric motor constant.

3. The method of claim 1, wherein the microprocessor is configured to manage operating parameters of the electric motor relating to generating a counter-driving power.

4. The method of claim 3, wherein the counter-driving power has a variable intensity that varies according to a current state of the virtual gearbox.

5. The method of claim 3, wherein the counter-driving power is used for vehicle braking.

6. The method of claim 3, wherein the counter-driving power simulates downshifting.

7. The method of claim 3, wherein the counter-driving power simulates engine braking caused by intrinsic friction of an internal combustion engine.

8. The method of claim 1, wherein parameters associated with the torque of the electric motor are managed by the microprocessor according to preset virtual operating conditions so as to simulate a law of progression during acceleration of a real vehicle having the mechanical gearbox with multiple gear ratios.

9. The method of claim 1, wherein the microprocessor manages operating parameters of the electric motor relating to simulating an engagement and a disengagement of a mechanical clutch.

10. The method of claim 1, further comprising reproducing a harmonized sound, the harmonized sound depending on instantaneous conditions of the electric motor that correspond to a sound spectrum of a real internal combustion engine in a same condition.

11. The method of claim 1, wherein the maximum torque and the maximum angular velocity are variable according to separate gear ratios.

12. The method of claim 1, wherein the maximum torque and the maximum angular velocity are variable according to a continuously variable transmission.

13. The method of claim 1, further comprising selecting a virtual gearbox ratio of the maximum torque and the maximum angular velocity as an input of the transmission.

14. The method of claim 13, wherein the selecting is activated automatically.

15. The method of claim 13, wherein the selecting is activated by a command from a vehicle operator.

16. The method of claim 15, further comprising inputting the command by the vehicle operator to the microprocessor via a user interface.

17. The method of claim 16, wherein the user interface is disposed in a steering wheel of the vehicle.

18. The method of claim 1, wherein the electric motor is independent of a propelling unit of the vehicle.

19. The method of claim 18, wherein, upon starting the electric motor, no load from the propelling unit is applied to the electric motor.

20. The method of claim 18, wherein, upon starting the electric motor, a load from the propelling unit is gradually applied to the electric motor.

\* \* \* \* \*